United States Patent [19]
Satoh

[11] Patent Number: 6,098,177
[45] Date of Patent: Aug. 1, 2000

[54] STORAGE UNIT HAVING REDUCED WAIT TIME OF PROCESS WITH RESPECT TO COMMAND REQUEST

[75] Inventor: Atsushi Satoh, Higashine, Japan

[73] Assignee: Fujitsu Limited, Kawasaki, Japan

[21] Appl. No.: 09/032,867

[22] Filed: Mar. 2, 1998

[30] Foreign Application Priority Data

Oct. 9, 1997 [JP] Japan ................................. 9-277756

[51] Int. Cl.[7] ............................. G06F 1/04; G11B 5/596
[52] U.S. Cl. .................. 713/500; 360/77.08; 369/44.34
[58] Field of Search ................................. 713/400, 500; 369/44.34; 360/75, 77.05, 77.06, 78.09, 78.14, 77.07

[56] References Cited

U.S. PATENT DOCUMENTS

| | | | |
|---|---|---|---|
| 5,859,742 | 1/1999 | Takaishi | 360/78.01 |
| 5,892,742 | 4/1999 | Yamashita et al. | 369/44.27 |
| 5,901,121 | 5/1999 | Yamashita et al. | 369/44.28 |
| 5,917,672 | 6/1999 | Pham et al. | 360/78.09 |
| 5,933,397 | 8/1999 | Yamashita et al. | 369/44.28 |
| 5,956,201 | 9/1999 | Pham et al. | 360/78.09 |

FOREIGN PATENT DOCUMENTS

| | | |
|---|---|---|
| 1-317283 | 12/1989 | Japan . |
| 7-254227 | 10/1995 | Japan . |
| 8-293176 | 11/1996 | Japan . |

*Primary Examiner*—Joseph E. Palys
*Assistant Examiner*—Mary Wang
*Attorney, Agent, or Firm*—Greer, Burns & Crain, Ltd.

[57] ABSTRACT

A storage unit is provided with at least one head for reproducing servo information from a medium, a processing part for carrying out a servo process to position the head with respect to the medium, and a setting part for setting a ratio of a first time with respect to a sampling time smaller in one of a data read state and a command wait state than in a data write state. The sampling time is made up of the first time in which the servo process is carried out by the processing part, and a second time in which a process with respect to a request from an external host unit is carried out.

9 Claims, 13 Drawing Sheets

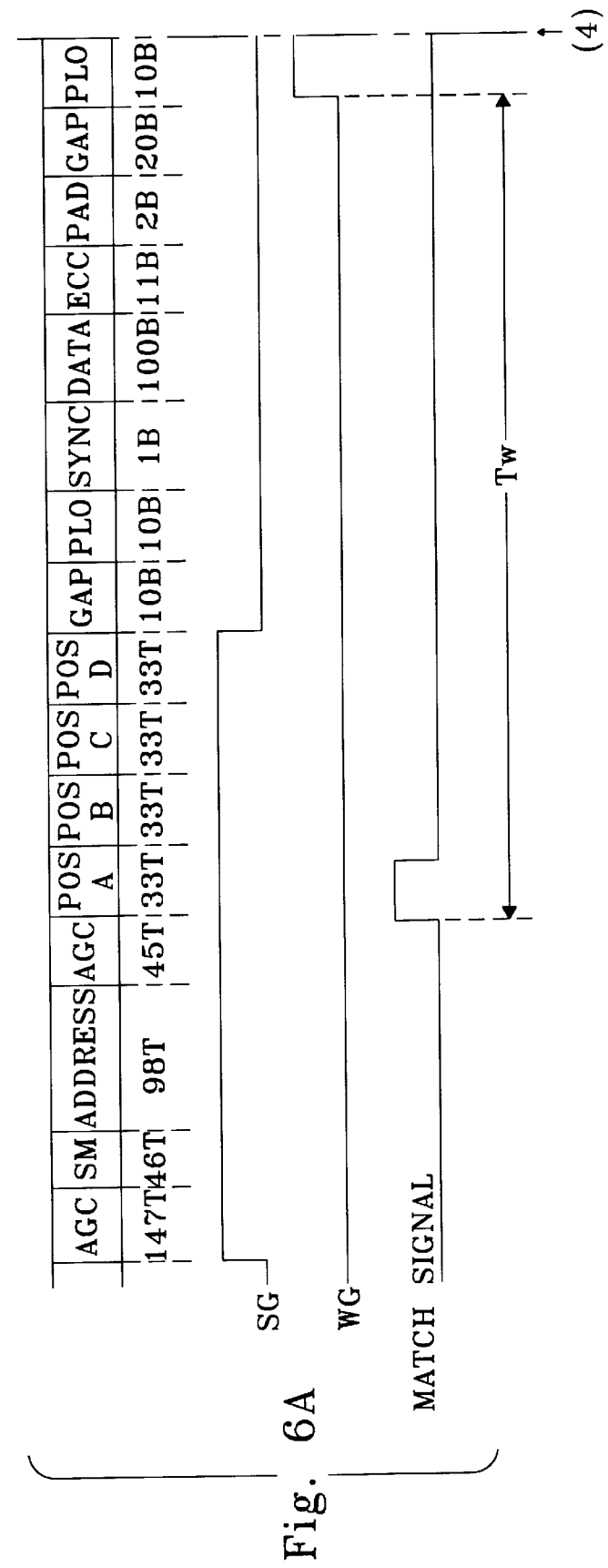

STORAGE UNIT HAVING REDUCED WAIT TIME OF PROCESS WITH RESPECT TO COMMAND REQUEST

BACKGROUND OF THE INVENTION

The present invention generally relates to storage units, and more particularly to a storage unit which reproduces servo information from medium such as a disk and carries out a servo process for positioning a head.

Portable personal computers such as lap-top computers have become popular, and disk units such as magnetic disk units are often used as storage units of the computers. As a result, the load on the disk unit is increasing every year. The processing speed of a host unit such as the personal computer depends on the data read/write speed of the disk unit which is used as the storage unit, and for this reason, there are demands to further increase the data read/write speed of the disk unit.

In a conventional magnetic disk unit, the positioning of a magnetic head with respect to a magnetic disk based on the servo information reproduced from the magnetic disk by the magnetic head is carried out as shown in FIG. 1, for example. In FIG. 1, a sampling time Ts is made up of a first time Ts1 in which a servo process is carried out for positioning the magnetic head with respect to the magnetic disk, and a second time Ts2 in which a process is carried out with respect to a command request from a host unit such as a personal computer. The servo process is carried out by generating an interrupt with respect to a firmware of the host unit at predetermined intervals. When the servo process ends, the process with respect to the command request is carried out if the command request is received from the host unit.

The first time Ts1 occupies approximately 40% to 50% of the sampling time Ts, and the servo process is carried out constantly because the servo process also has the role of monitoring vibration and shock applied to the magnetic disk unit. On the other hand, it is impossible to know when the command request will be issued from the host unit, and the process with respect to the command request from the host unit is carried out at an arbitrary time during the sampling time Ts.

However, when the command request from the host unit is issued at the start of the sampling time Ts, there was a problem in that the process with respect to this, command request must wait for a time amounting to approximately 40% to 50% of the sampling time Ts. In addition, since the first time Ts1 which is allocated for the servo process occupies. approximately 40% to 50% of the entire sampling time Ts, there was another problem in that the second time Ts2 allocated for the process with respect to the command request cannot be set long.

SUMMARY OF THE INVENTION

Accordingly, it is a general object of the present invention to provide a novel and useful storage unit in which the problems described above are eliminated.

Another and more specific object of the present invention is to provide a storage unit which can improve the processing speed of a host unit, by reducing a wait time of a process with respect to a command request from the host unit, and by increasing ratio of a time which is allocated for a process with respect to the command request relative to a sampling time.

Still another object of the present invention is to provide a storage unit comprising at least one head reproducing servo information from a medium, process means for carrying out a servo process to position the head with respect to the medium, and setting means for setting a ratio of a first time with respect to a sampling time smaller in one of a data read state and a command wait state than in a data write state, wherein the sampling time is made up of the first time in which the servo process is carried out by the process means, and a second time in which a process with respect to a request from an external host unit is carried out. According to the storage unit of the present invention, it is possible to reduce the wait time of the process with respect to a command request from the host unit, and to improve the processing speed of the host unit by increasing the ratio of the time allocated for the process with respect to command request relative to the sampling time.

The storage unit may further comprise reducing means for reducing the ratio of the first time with respect to the sampling time in the data write state at predetermined intervals. In this case, it is possible to improve the processing speed of the host unit by reducing the first time.

The storage unit may further comprise reducing means for reducing the ratio of the first time with respect to the sampling time in the data write state at predetermined intervals. In addition, the process means may only monitors position information of the servo information during the first time having a reduced ratio with respect to the sampling time. Moreover, the first time having the reduced ratio with respect to the sampling time may be approximately 10% of the sampling time in the data write state or less. Furthermore, the setting means may set the sampling time in one of the data read state and command wait state to approximately 2 times the sampling time in the data write state or greater. In these cases, it is possible to improve the processing speed of the host unit also at the time of the data write.

In the storage unit, each of a plurality of heads may reproduce the servo information from a corresponding one of a plurality of mediums. In this case, it is possible to improve the processing speed of the host unit when the present invention is applied to a storage unit employing the so-called data-surface servo system.

In the storage unit, one of a plurality of heads may reproduce the servo information from one of a plurality of mediums. In this case, it is possible to improve the processing speed of the host unit when the present invention is applied to a storage unit employing the so-called servo-surface servo system.

Other objects and further features of the present invention will be apparent from the following detailed description when read in conjunction with the accompanying drawings.

BRIEF DESCRIPTION OF THE DRAWINGS

FIGS. 6A and 6B respectively are diagrams of the part P of the magnetic disk shown in FIG. 3 on an enlarged scale, showing a data structure and various control signals during a data write in a time sequential manner;

DESCRIPTION OF THE PREFERRED EMBODIMENTS

Figure 2:
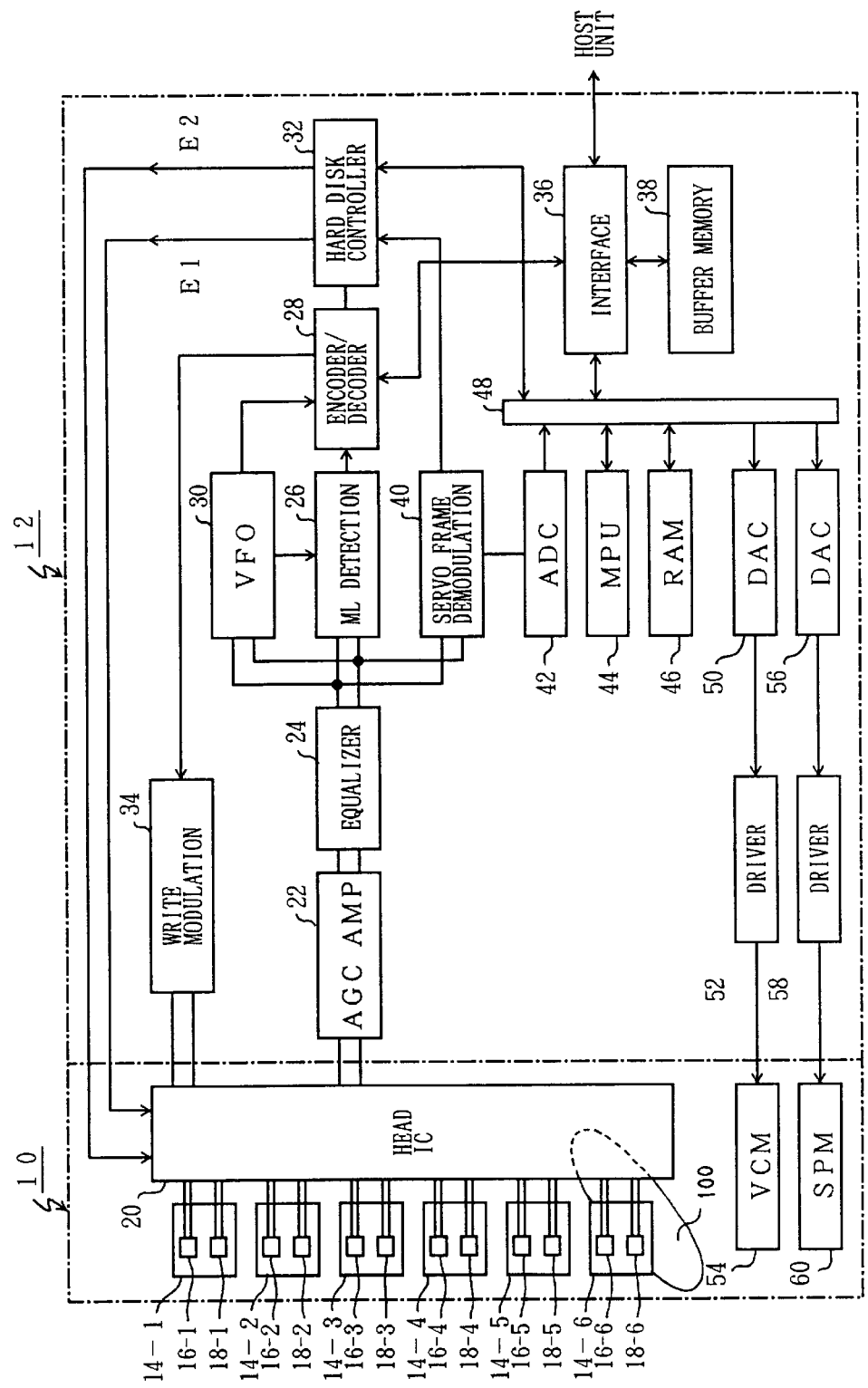
FIG. 2 is a system block diagram showing the general construction of an embodiment of a storage unit according to the present invention.

FIG. 2 is a system block diagram showing the general construction of an embodiment of a storage unit (or memory apparatus) according to the present invention. In this embodiment, the present invention is applied to a magnetic disk unit employing the so-called data-surface servo (or sector servo) system which records servo information in a servo frame provided at a start of each sector of a data surface on a magnetic disk.

In FIG. 2, the magnetic disk unit includes a disk enclosure 10, and a drive controller 12 which is coupled to a host unit (not shown). In this embodiment, the disk enclosure 10 includes 6 composite heads 14-1 through 14-6, a head integrated circuit (IC) 20, a voice coil motor (VCM) 54, and a spindle motor (SPM) 60. The composite heads 14-1 through 14-6 respectively include write heads 16-1 through 16-6 and read heads 18-1 through 18-6. Inductive heads are used for the write heads 16-1 through 16-6, and magneto resistive (MR) heads are used for the read heads 18-1 through 18-6. The composite heads 14-1 through 14-6 are coupled to the head IC 20, and are selected responsive to a head switching signal E1 and a read/write switching signal E2 which are obtained from the drive controller 12.

At the time of a data read operation, the head IC 20 selects one of the composite heads 14-1 through 14-6 in response to the head switching signal E1, and at the same time, selects a corresponding one of the read heads 14-1 through 18-6 of the selected composite head in response to the read/write switching signal E2 which makes the switching to the read valid. The selected read head is coupled to an automatic gain control (AGC) amplifier 22 provided in the driver controller 12. For example, the head IC 20 selects the composite head 14-1 in response to the head switching signal E1, and in this case, the head IC 20 simultaneously selects the read head 18-1 of the composite head 14-1 in response to the read/write switching signal E2 and couples this read head 18-1 to the AGC amplifier 22.

A signal read from a magnetic disk by the selected read head 18-1 is amplified to a predetermined amplitude by the AGC amplifier 22, and is subjected to an equalization process in an equalizer circuit 24 so as to remove interwaveform interference. An output of the equalizer circuit 24 is supplied to a most likelihood detection circuit 26 which carries out a decoding process with respect to the bit data. The equalizer circuit 24 and the most likelihood detection circuit 26 form a demodulation part which uses the partial response most likelihood detection. For example, in the case of the partial response class 4 most likelihood detection (PR4ML), the equalizer circuit 24 carries out a (1-d) equalization, and the most likelihood detection circuit 26 carries out the demodulation of the bit data according to the most likelihood Viterbi detection method with respect to the (1-D) partial response reproduced signal.

The output of the equalizer circuit 24 is also supplied to a variable frequency oscillator (VCO) circuit 30 which generates a clock signal for use in generating a timing that is required to demodulate the read data. The data demodulated by the most likelihood detection circuit 26 is supplied to an encoder/decoder 28. At the time of the read operation, the encoder/decoder 28 is switched to function as an encoder, and since the demodulated data is a run length limited (RLL) code, for example, the encoder/decoder 28 converts the RLL code back into the original NRZ data.

The NRZ data which is obtained by the encoding made in the encoder/decoder 28 is converted into parallel data in an interface circuit 36 and is thereafter stored in a buffer memory 38. When the parallel data stored in the buffer memory 38 reaches a predetermined amount, the transfer of the read data with respect to the host unit is started. A hard disk controller 32 controls a read modulation circuit part (not shown) and a write modulation circuit part 34 of the driver controller 12, and also controls the switching of the head with respect to the head IC 20 and the switching of the read/write. Furthermore, if necessary, the hard disk controller 32 also functions as a formatter for carrying out an error correction code (ECC) process and the like with respect to the NRZ data that is obtained by the encoder function of the encoder/decoder 28 at the time of the read operation.

On the other hand, at the time of a data write operation, the write head 16-1 of the composite head 14-1 is selected, for example, in response to the head switching signal E1 and the read/write switching signal E2 which makes the switching to the write valid. With respect to the selected write head 16-1, the NRZ data transferred from the host unit is supplied to the encoder/decoder 28 via the interface circuit 36 as serial NRZ data.

At the time of the data write operation, the encoder/decoder 28 functions as a decoder, and the encoder/decoder 28 converts the NRZ data into a predetermined RLL code and supplies he predetermined RLL code to the write modulation circuit part 34. The write modulation circuit part 34 subjects the RLL code from the encoder/decoder 28 to a 1/(1+D) conversion precoding, and carries out a write compensation which is known as a write precompensate. In the write modulation circuit part 34, the data subjected to the write compensation is latched and thereafter converted into a write current, and the write current is supplied to the write head 16-1 which is selected by the head IC 20 so as to write data with respect to a magnetic disk 100. In FIG. 2, only the magnetic disk 100 with respect to the composite head 14-6 is shown for the sake of convenience, but of course, one magnetic disk 100 is provide with respect to each of the composite heads 14-1 through 14-6.

With respect to the read/write system described above, a servo frame demodulation circuit 40 is provided to position each of the composite heads 14-1 through 14-6 with respect to an arbitrary cylinder position of the magnetic disk 100. A reproduced signal from the equalizer circuit 24 is supplied to the servo frame demodulation circuit 40. This embodiment employs the data-surface servo (or sector servo) system which records servo information in a servo frame provided at a start of each sector on the data surface of the magnetic disk 100. For this reason, at the time of the read operation or the write operation, the signal read by the read head of the composite head which is selected by the head IC 20 is supplied to the servo frame demodulation circuit 40. In addition, the servo frame demodulation circuit 40 demodulates head position information from the servo information that is included in the servo frame, and the head position information is input to a microprocessor unit (MPU) 44 via an analog-to-digital converter (ADC) 42 and a bus 48.

A random access memory (RAM).46 for developing processing programs and control data via the bus 48 is provided with respect to the MPU 44. The MPU 44 can receive via the bus 48 various commands which are received from the host unit by the interface circuit 36. When the MPU 44 receives a seek command from the host unit via the interface circuit 36, the MPU 44 carries out a seek control for moving the composite head to a target cylinder position specified by the seek command. When the composite head reaches the target cylinder position, the MPU 44 carries out a fine control (or on-track control) for positioning the composite head on the target cylinder and making the composite head follow the target cylinder.

In order to carry out the seek control and the on-track control by the MPU 44, a digital-to-analog converter (DAC) 50 and a driver 52 are provided with respect to the VCM 54 via the bus 48. This VCM 54 is provided in the disk enclosure 10 and drives a head actuator (not shown) which moves the composite heads 14-1 through 14-6. The MPU 44 computes a control current that is necessary to control the VCM 54, and outputs the control current to the DAC 50. The DAC 50 converts the control current into an analog signal, and this analog signal drives the driver 52 so that a control current specified by the MPU 44 flows to the VCM 54.

In addition, a DAC 56 and a driver 58 are provided with respect to the SPM 60 provided in the disk enclosure 10. Hence, the magnetic disk 100 is rotated at a constant speed by controlling the SPM 60.

The details of a head positioning control part realized by the MPU 44 are known and proposed in a Japanese Laid-Open Patent Application No.8-293176, for example. Hence, a description of the details of the head positioning control part will be omitted in this specification.

Figure 3:
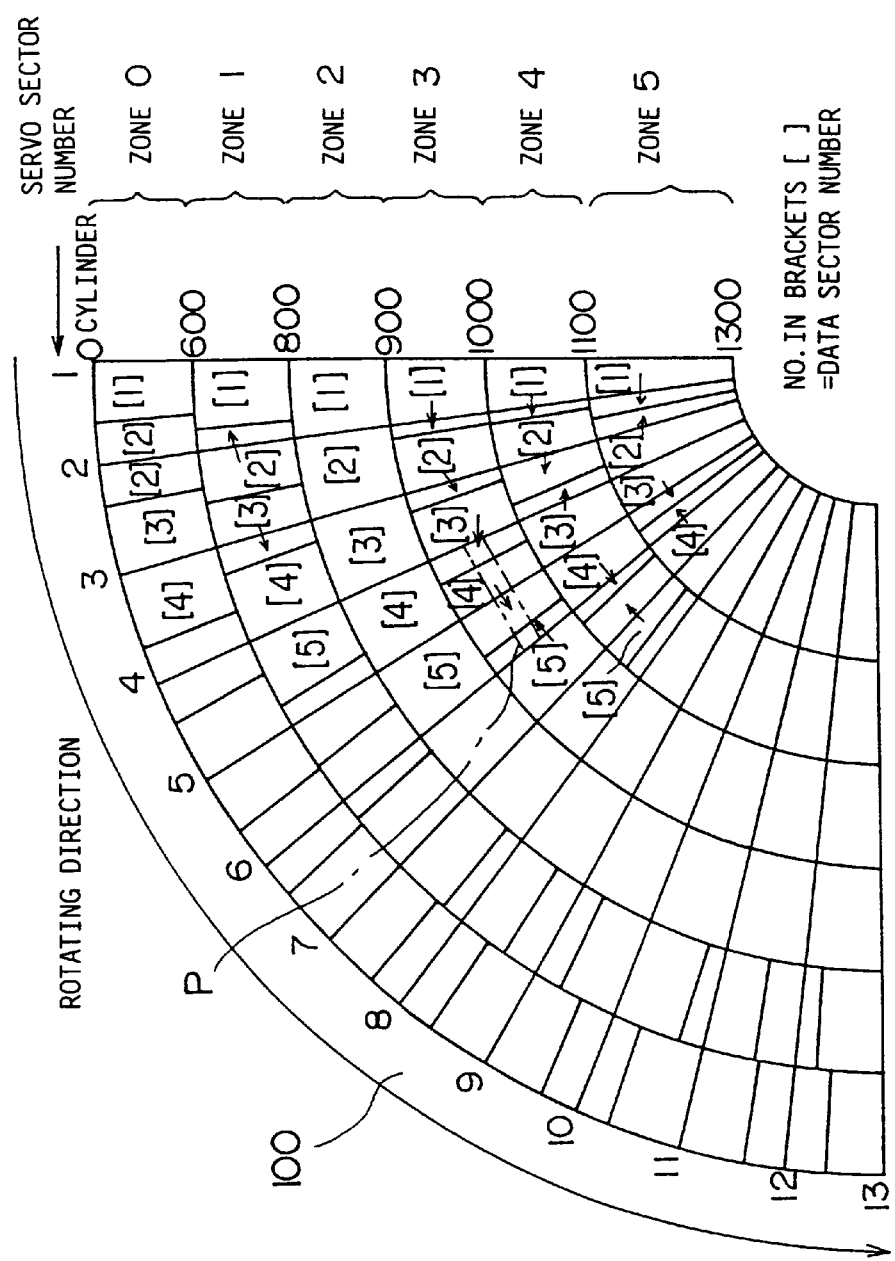
FIG. 3 is a plan view showing a part of a magnetic disk.

Next, a description will be given of the data structure on the data surface of the magnetic disk 100, by referring to FIGS. 3 through 7. FIG. 3 is a plan view showing a part of the magnetic disk 100, and only a part corresponding to approximately ¼ of the entire data surface is shown in FIG. 3. In FIG. 3, the magnetic disk 100 is sectioned into 6 zones 0 through 5 in the radial direction of the magnetic disk 100. There are 1300 cylinders from the outer periphery to the inner periphery of the magnetic disk 100. Each zone is sectioned into 48 sectors in the circumferential direction of the magnetic disk 100. In other words, there are 48 servo sectors in each zone. For the sake of convenience, FIG. 3 shows the data structure for a case where a constant density recording is carried out.

Figure 4A:
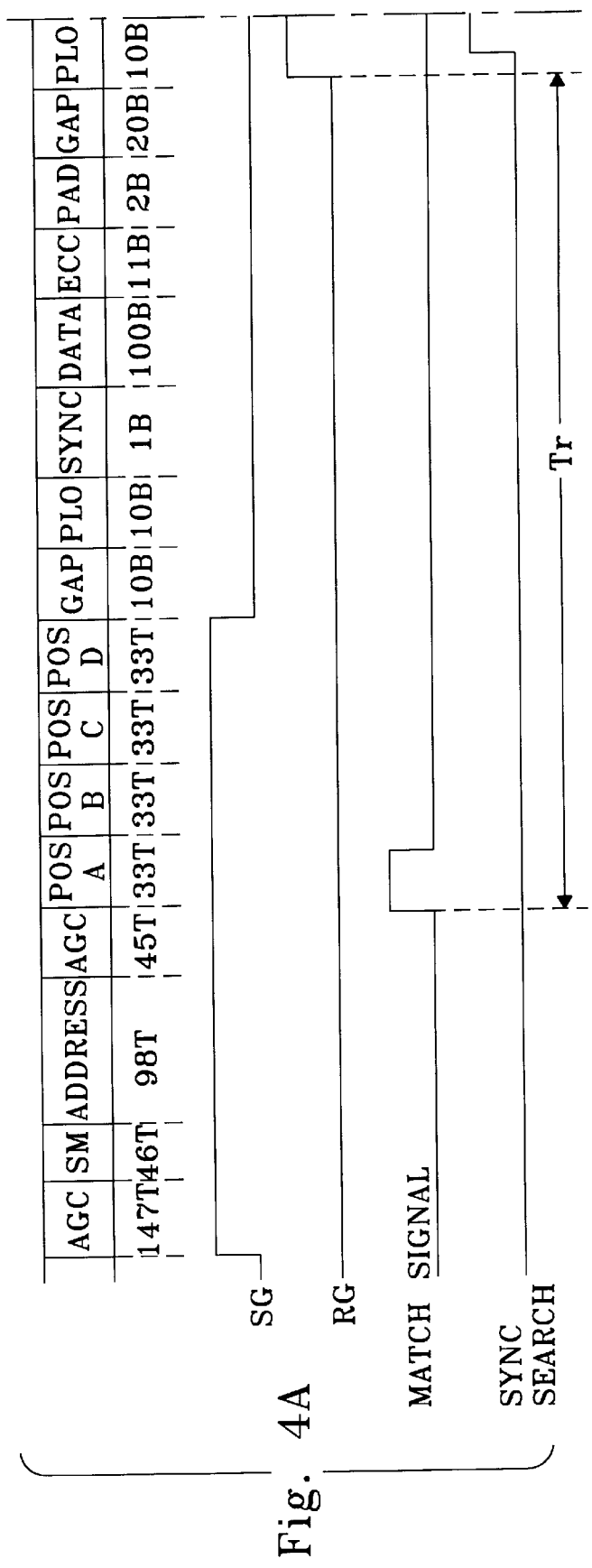
FIGS. 4A and 4B respectively are diagrams of a part P of the magnetic disk shown in FIG. 3 on an enlarged scale, showing a data structure and various control signals during a data read in a time sequential manner.
Figure 4B:
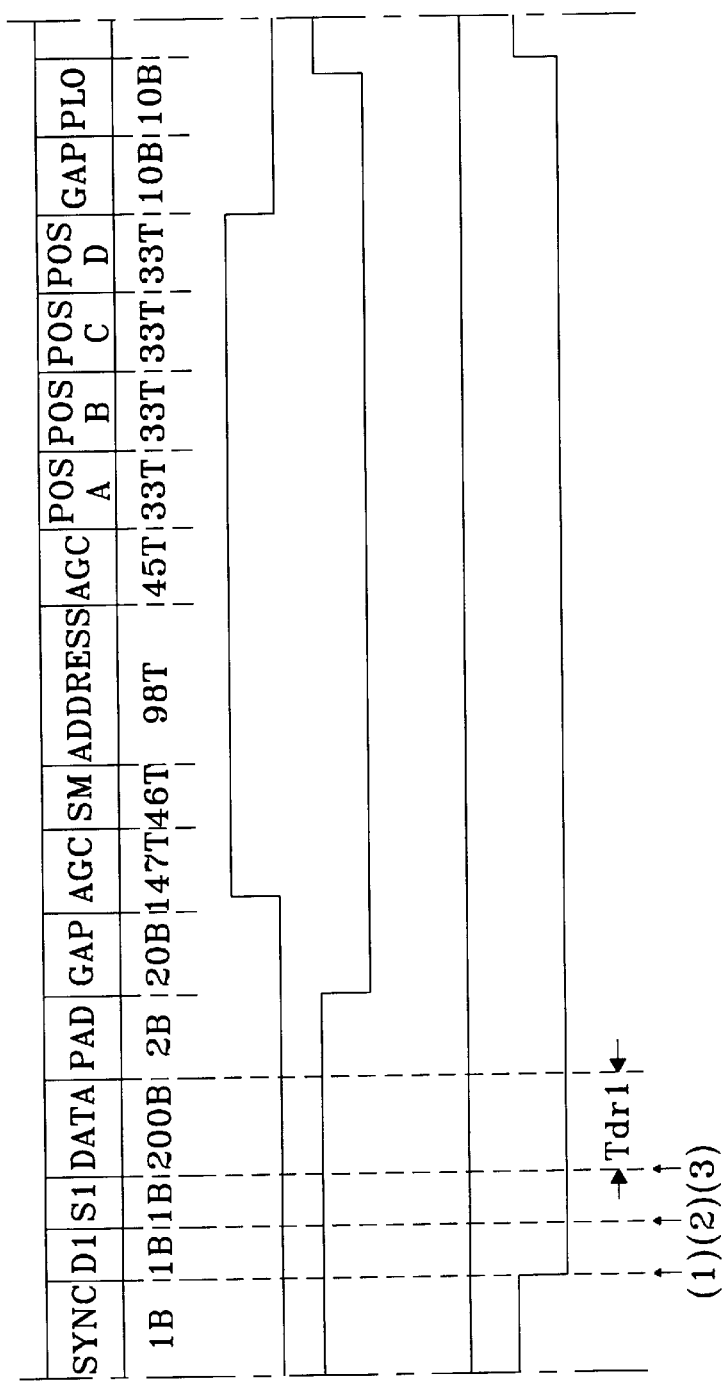
Figure 5:
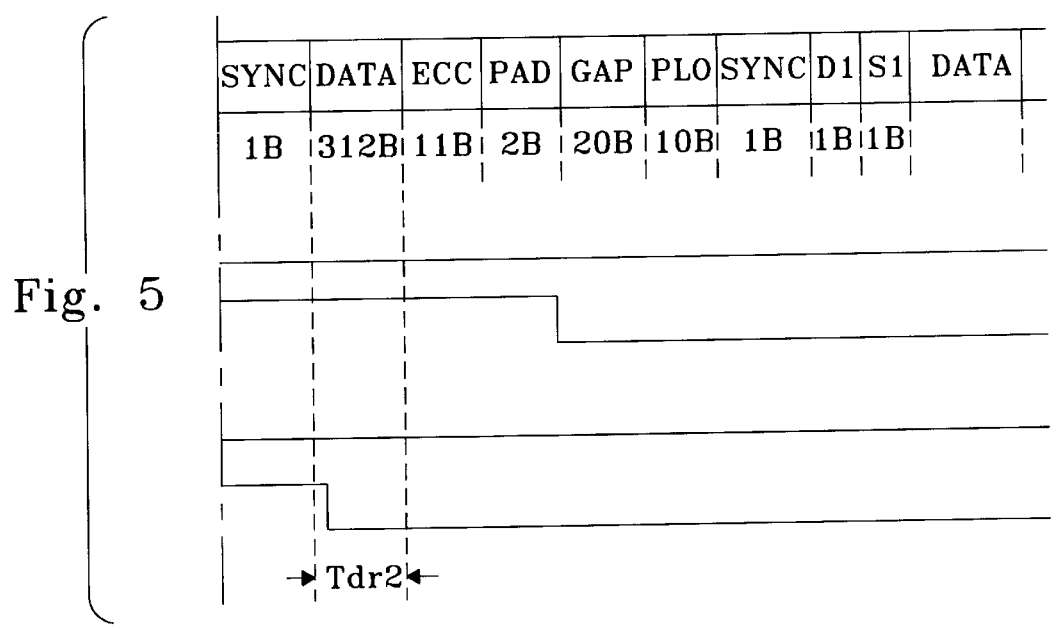
FIG. 5 is a diagram of the part P of the magnetic disk shown in FIG. 3 on an enlarged scale, showing the data structure and various control signals during the data read in a time sequential manner.

FIGS. 4A, 4B and 5 respectively are diagrams of a part P of the magnetic disk 100 shown in FIG. 3 on an enlarged scale, showing a data structure and various control signals during the data read in a time sequential manner. On the other hand, FIGS. 6A, 6B and 7 respectively are diagrams of the part P of the magnetic disk 100 shown in FIG. 3 on an enlarged scale, showing the data structure and the various control signals during the data write in a time sequential manner.

In FIGS. 4A, 4B and 5, AGC denotes a region which is provided as a preparation time for reading the servo information, SM denotes a region recorded with a servo mark which specifies a start of the servo information, POSA through POSD denote regions recorded with position information for determining the head position, GAP denotes a gap region in which no magnetic inversion exists between the servo information region and the data region, PLO denotes a circuit stabilizing region, SYNC denotes a region recorded with a synchronizing signal for carrying out the data read, DI denotes a region recorded with defect information, SI denotes a region recorded with split information, PAD denotes a region which is set to prevent an erroneous demodulation, and ECC denotes a region recorded with the error correction code (ECC) of the read data. In addition, ADDRESS specifies a servo address formed by the cylinder address, and DATA within the data regions shown in FIGS. 4A and 4B respectively indicate a first half and a second half. of the data for a case where a data division occurs during the constant density recording. One data sector is formed by the two data DATA. The servo address ADDRESS may be formed by the cylinder address and the sector address.

In addition, T indicates a time interval of 62.5 nsec, and B indicates a number of 1-byte data. Moreover, Tr indicates a time until a read gate RG set by the MPU 44 turns ON, Tdr1 indicates a time in which the number of data (amounting to 200 B (bytes)) written in the split information SI is read, and Tdr2 indicates a time in which the number of data (amounting to 312 B) obtained by (512B−Tdr1) is read. Furthermore, (1) indicates a detection timing of the synchronizing signal SYNC, (2) indicates a read timing of the defect information DI, and (3) indicates a read timing of the split information SI.

A servo gate signal SG for reading the servo information, a read gate signal RG, an address match signal and a SYNC search signal are used as the control signals.

Figure 6B:
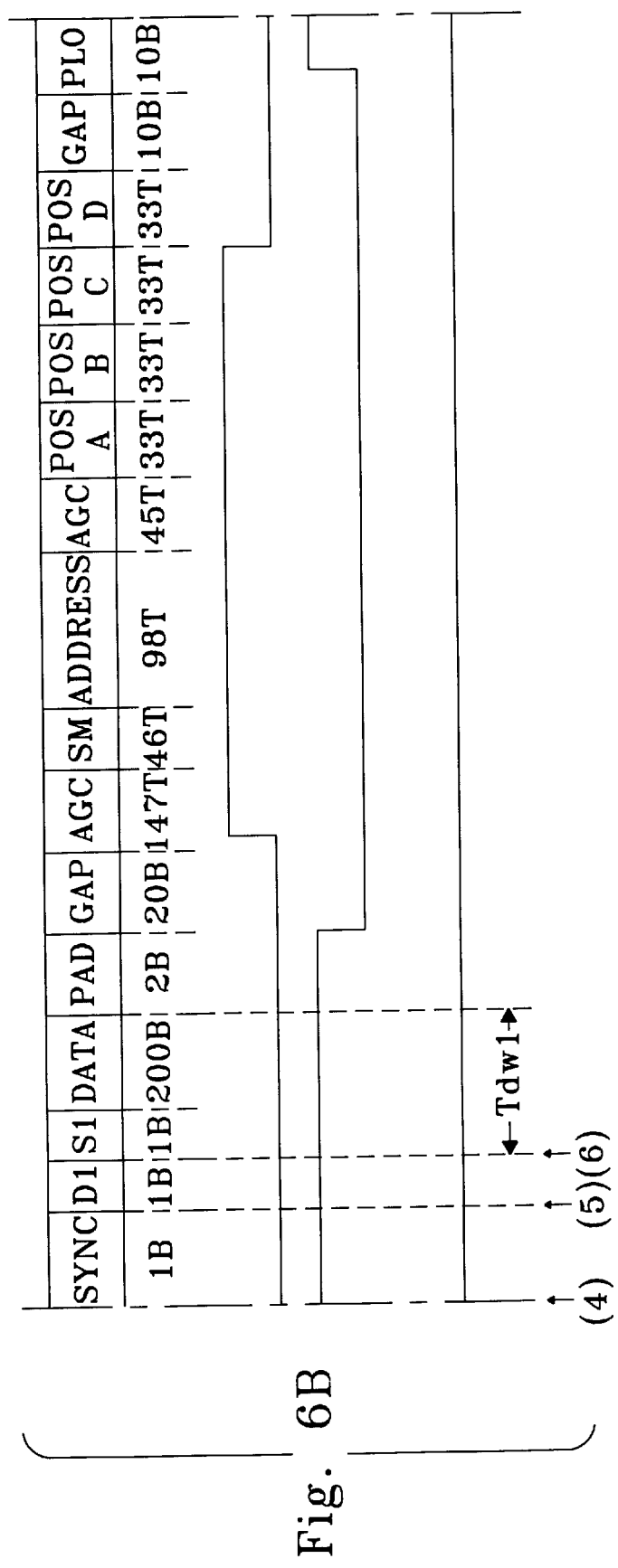
Figure 7:
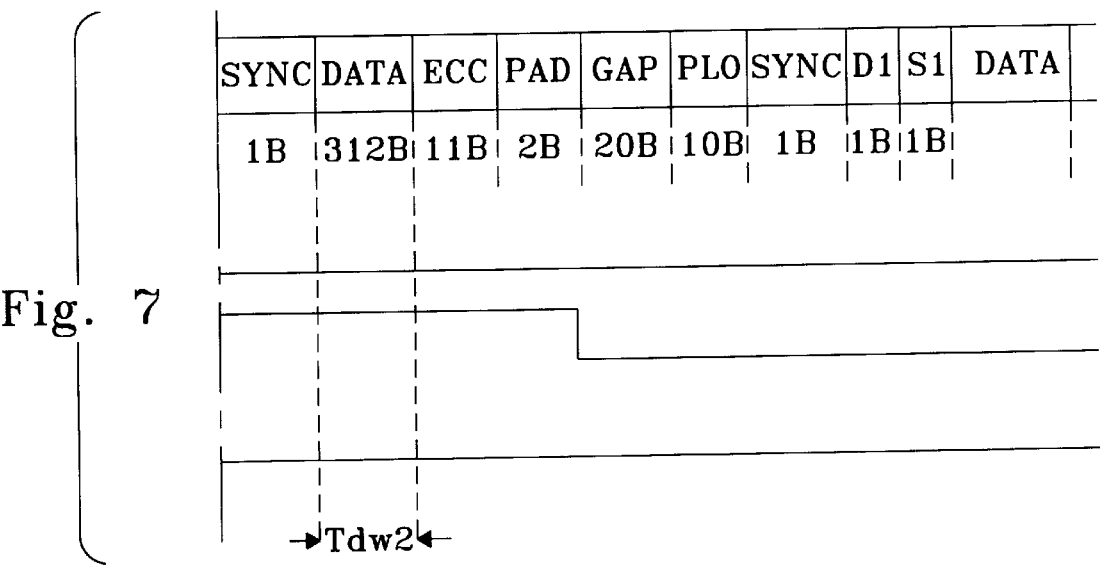
FIG. 7 is a diagram of the part P of the magnetic disk shown in FIG. 3 on an enlarged scale, showing the data structure and various control signals during the data write in a time sequential manner.

Similarly, in FIGS. 6A, 6B and 7, Tw indicates a time until a write gate WG set by the MPU 44 turns ON, Tdw1 indicates a time in which the number of data (amounting to 200 B) written in the split information SI is written, and Tdw2 indicates a time in which the number of data (amounting to 312 B) obtained by (512 B−Tdw1) is written. In addition, (4) indicates write timing of the synchronizing signal SYNC, (5) indicates a write timing of the defect. information DI, and (6) indicates a write timing of the split information SI.

The servo gate signal SG for reading the servo information, the write gate signal WG and the address match signal are used as the control signals. Other designations used in FIGS. 6A, 6B and 7 are the same as the designations used in FIGS. 4A, 4B and 5. In addition, the details of the magnetic disk unit. itself for carrying out the data read/write with the data structure shown in FIGS. 3 through 7 by employing the data-surface servo system are known and proposed in a Japanese Laid-Open Patent Application No.7-254227, for example. Hence, a description of the details of the magnetic disk unit for carrying out the data read/write with the above data structure employing the data-surface servo system will be omitted in this specification.

Figure 8:
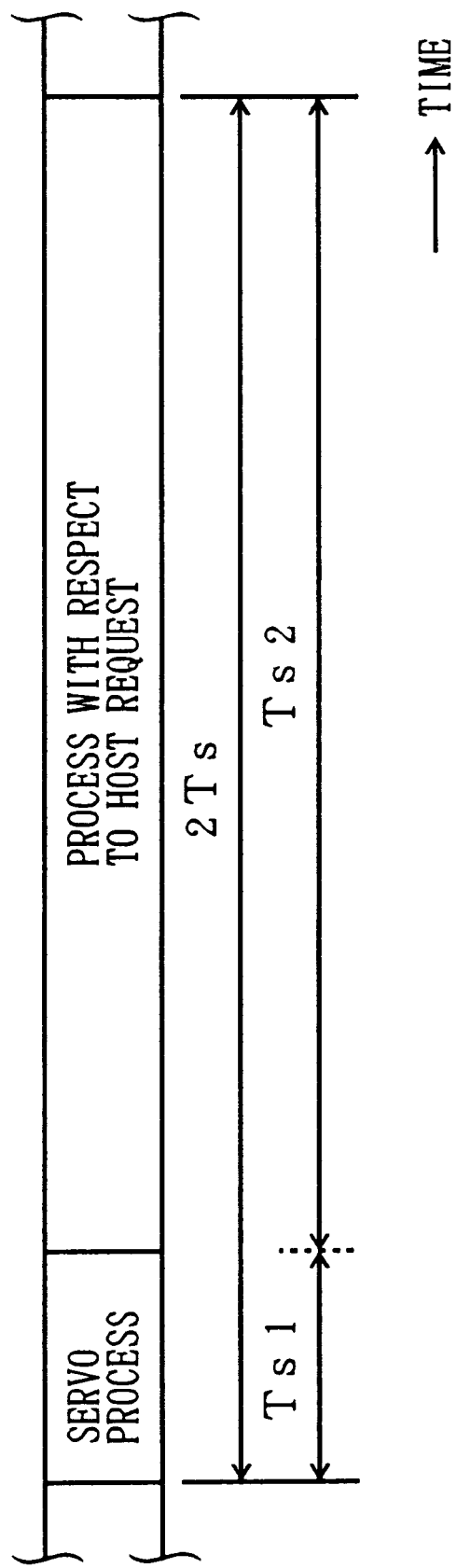
FIG. 8 is a diagram for explaining a process in a command wait state or a data read state.

Next, a description will be given of the operation of this embodiment at the time of the data read, by referring to FIGS. 8 and 9. FIG. 8 is a diagram for explaining the process in a command wait state or a data read state. In addition, FIG. 9 is a flow chart for explaining the process of the MPU 44 in the command wait state or the data read state.

In this embodiment, the positioning of the composite head 14-1 with respect to the magnetic disk 100 based on the servo information reproduced from the magnetic disk 100 by the read head 18-1 of the composite head 14-1, for example, is carried out as shown in FIG. 8. In FIG. 8, a sampling time 2Ts is made up of a first time Ts1 for carrying out a servo process to position the composite head 14-1 with respect to the magnetic disk 100, and a second time Ts2 for carrying out a process with respect to a command request from the host unit. The servo process is carried out by generating an interrupt with respect to the firmware at predetermined intervals. When the servo process ends, the process with respect to the command request is carried out if the command request is received from the host unit.

Figure 1:
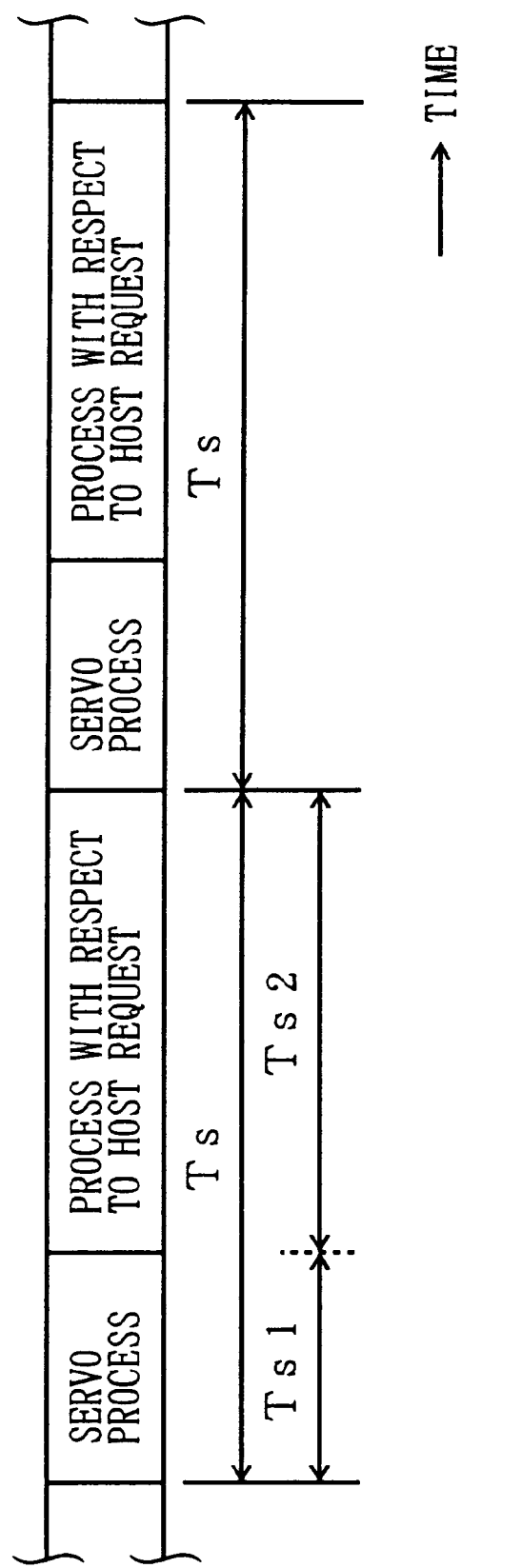
FIG. 1 is a diagram for explaining a conventional positioning of a magnetic head with respect to a magnetic disk based on servo information reproduced from the magnetic disk.

A ratio of the first time Ts1 with respect to the sampling time 2Ts is approximately 1.25% and small because the sampling time 2Ts is approximately 2 times the sampling time Ts of the conventional case shown in FIG. 1. However, the servo process is constantly carried out since the servo process also has the role of monitoring vibration and shock applied to the magnetic disk unit. On the other hand, it is impossible to know when the command request will be issued from the host unit, and the process with respect to the command request from the host unit is carried out at an arbitrary time during the sampling time 2Ts. Even if the command request from the host unit is issued at the start of the sampling time 2Ts, the process with respect to this command request only needs to wait for a time amounting to approximately 12.5% of the sampling time 2Ts. In addition, the first time Ts1 allocated for the servo process only occupies approximately 12.5% of the entire sampling time 2Ts, and for this reason, it is possible to set a long time for the second time Ts2 which is allocated for the process with respect to the command request. Accordingly, the frequency of a process of saving variables and the like of the firmware in the RAM 46 or the like every time the interrupt is generated by the servo process becomes extremely small, and it becomes possible to carry out the process of the host unit continuously for a relatively long time. In other words, it is possible to reduce the wait time of the process with respect to the command request from the host unit, and to increase the ratio of the second time Ts2 which is allocated for the process with respect to the command request relative to the sampling time 2Ts, thereby improving the processing speed of the host unit.

Figure 9:
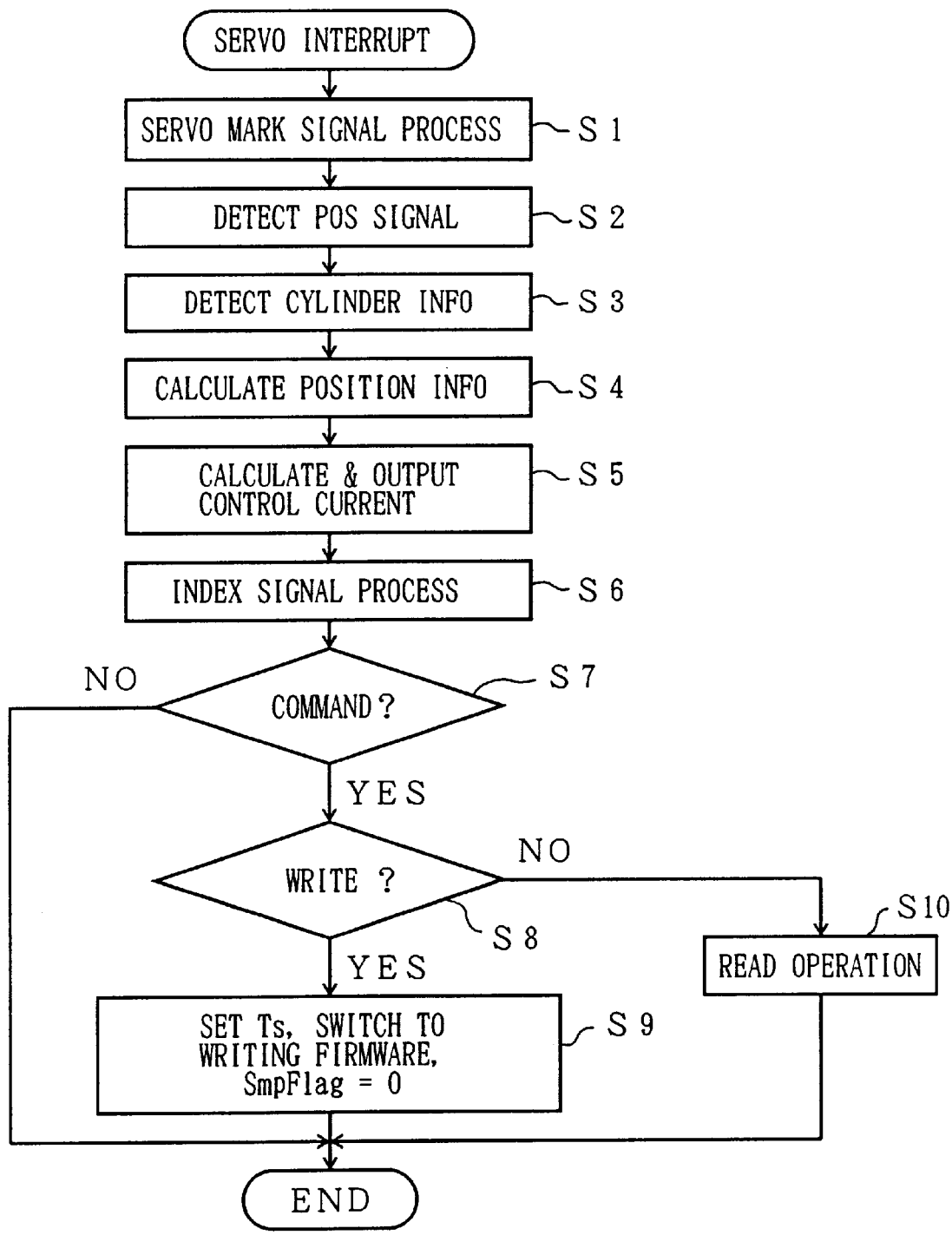
FIG. 9 is a flow chart for explaining a process of a MPU in the command wait state or the data read state.

In FIG. 9, when an interrupt is generated with respect to the firmware of the host unit by the servo process, the MPU 44 detects the start of the servo information in a step S1 by carrying out a process with respect to a servo mark signal which is read from the servo mark region SM of the magnetic. disk 100 out of the signals read from the magnetic disk 100. A step S2 detects position information read from the position information regions POSA through POSD of the magnetic disk 100. In addition, a step S3 detects cylinder information from the servo address ADDRESS read from the magnetic disk 100. A step S4 calculates position information indicating the position of the composite head 14-1 on the magnetic disk 100 based on the information detected in the steps S2 and S3. A step S5 calculates a control current which is to be supplied to the DAC 50 based on the above described position information, and outputs the calculated control current to the DAC 50 via the bus 48.

A step S6 carries out an index signal process, and a step S7 decides whether or not a command request is received from the host unit. The process ends if the decision result in the step S7 is NO. On the other hand, if the decision result in the step S7 is YES. a step S8 decides whether or not the operation mode of the magnetic disk unit is a data write mode. If the decision result in the step S8 is YES, a step S9 sets the sampling time to Ts, switches the process to that of the writing firmware of the host unit, sets a flag SmpFlag to 0, and the process ends. On the other hand, if the decision result in the step S8 is NO, a step S10 carries out a read operation, and the process thereafter ends.

Figure 10:
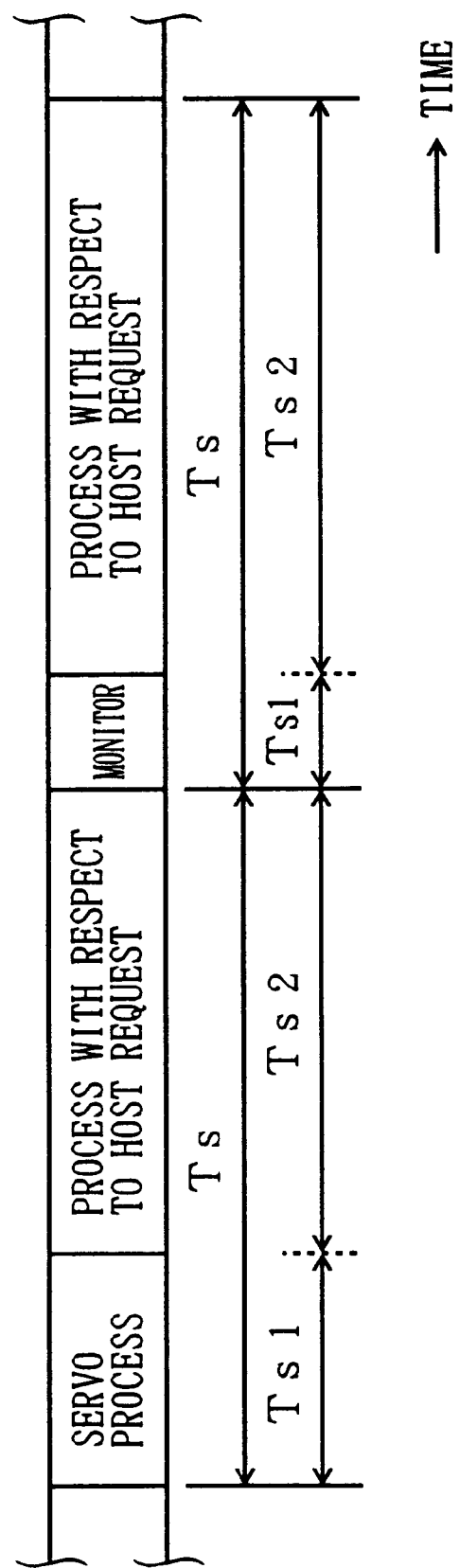
FIG. 10 is a diagram for explaining a process in a data write-state.
Figure 11:
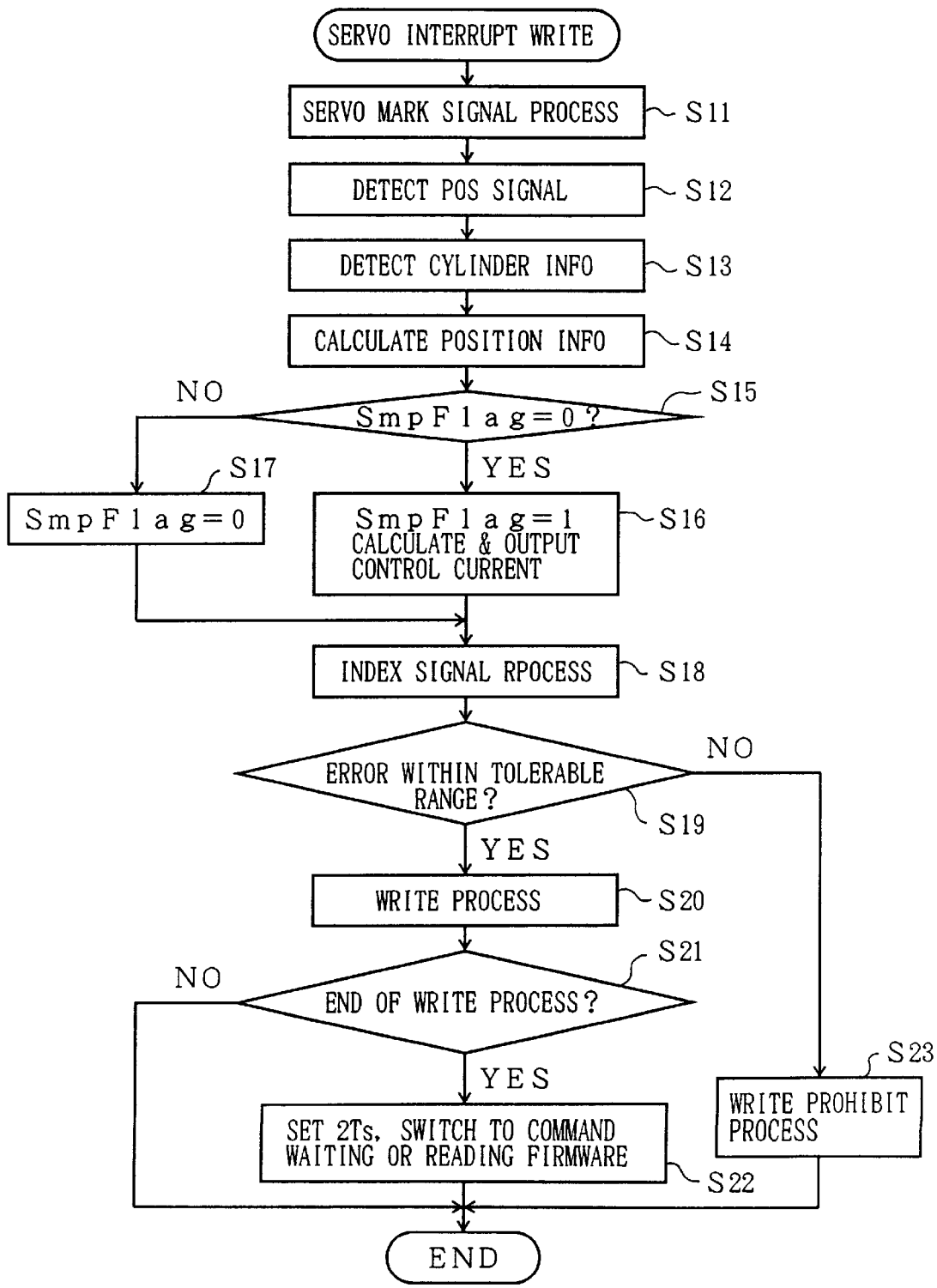
FIG. 11 is a flow chart for explaining a process of the MPU in the data write state.

Next, a description will be given of the operation of this embodiment at the time of the data write, by referring to FIGS. 10 and 11. FIG. 10 is a diagram for explaining the process in a data write state. In addition, FIG. 11 is a flow chart for explaining the process of the MPU 44 in the data write state.

In this embodiment, the positioning of the composite head 14-1 with respect to the magnetic disk 100 based on the servo information reproduced from the magnetic disk 100 by the read head 18-1 of the composite head 14-1, for example, is carried out as shown in FIG. 10. In FIG. 10, a sampling time Ts is made up of a first time Ts1 for carrying out a servo process to position the composite head 14-1 with respect to the magnetic disk 100, and a second time Ts2 for carrying out a process with respect to a command request from the host unit. The servo process is carried out by generating an interrupt with respect to the firmware at predetermined intervals. When the servo process ends, the process with respect to the command request is carried out if the command request is received from the host unit.

The ratio of the first time Ts1 with respect o the sampling time Ts is the same for every other sampling time Ts. However, between 2 mutually adjacent sampling times Ts, the first time Ts1 of one sampling time Ts is set shorter than the first time Ts1 of the other sampling time Ts. In FIG. 10, the first time Ts1 within the sampling time Ts on the left side is approximately 40% to 50% of the sampling time Ts and is relatively long, but the first time Ts1 within the sampling time Ts on the right side is approximately 10% of the sampling time Ts and is extremely short. The servo process is constantly carried out since the servo process also has the role of monitoring vibration and shock applied to the magnetic disk unit. However, in FIG. 10, only the monitoring of the positional error caused by the vibration, shock and the like applied to the magnetic disk unit is carried out during the first time Ts1 within the sampling time Ts on the right side. This monitoring process carried out during the first time Ts1 within the sampling time Ts on the right side is short compared to the servo process that is carried out during the first time Ts1 within the sampling time Ts on the left side, because this monitoring process does not require the complicated calculations and the like for making the positioning.

As described above, the sampling time at the time of the data write is set to Ts and not 2Ts, and for this reason, it is possible to prevent the write head 16-1 from writing data to a position other than a target position on the magnetic disk 100 due to delayed detection of the vibration, shock and the like applied to the magnetic disk unit. On the other hand, the first time Ts1 is set short for every other sampling time Ts, and since only the positional error caused by the vibration, shock and the like applied to the magnetic disk unit is monitored in the short first time Ts1, the process with respect to the command request from the host unit will not have to wait for a long time. Accordingly, the frequency at which the process of saving variables or the like of the firmware in the RAM 46 or the like every time the interrupt is generated by the servo process is relatively small, and it is possible to carry out the process of the host unit continuously for a relatively long time. In other words, it is possible to reduce the wait time of the process with respect to the command request from the host unit, and to improve the processing speed of the host unit by increasing the ratio of the second time Ts2 which is allocated for the process with respect to the command request relative to the sampling time Ts.

In FIG. 11, when an interrupt is generated with respect to the firmware of the host unit by the. servo process, the MPU 44 detects the start of the servo information in a step S11 by carrying out a process with respect to a servo mark signal which is read from the servo mark region SM of the magnetic disk 100 out of the signals read from the magnetic disk 100. A step S12 detects position information read from the position information regions POSA through POSD of the magnetic disk 100. In addition, a step S13 detects cylinder information from the servo address ADDRESS read from the magnetic disk 100. A step S14 calculates position information indicating the position of the composite head 14-1 on the magnetic disk 100 based on the information detected in the steps S12 and S13. A step S15 decides whether or not a flag SmpGlag is 0. If the decision result in the step S15 is NO, a step S17 sets the flag SmpFlag to 0, and the process advances to a step S18 which will be described later.

On the other hand, if the decision result in the step S15 is YES, a step S16 sets the flag SmpFlag to 1. In addition, the step S16 calculates a control current which is to be supplied to the DAC 50 based on the position information described above, and outputs the calculated control current to the DAC 50 via the bus 48. After the step S16, the process advances to the step S18.

The step S18 carries out an index signal process, and a step S19 decides whether or not a decision result of the positional error of the composite head 14-1 with respect to the target position is within a tolerable range. If the decision result in the step S19 is YES, a step S20 carries out a data write process. A step S21 decides whether or not the data write process has ended, and the process ends if the decision result in the step S21 is NO. On the other hand, if the decision result in the step S21 is YES, a step S22 sets the sampling time to 2Ts, switches the process to that of the command wait or reading firmware of the host unit, and the process. ends. In addition, if the decision result in the step S19 is NO, a step S23 carries out a prohibit process with respect to the data write, and the process ends.

In this embodiment, the sampling time 2Ts in the command wait state or the data read state of the magnetic disk unit is set to 2 times the sampling time Ts in the data write state of the magnetic disk unit, but it is of course possible to set the sampling time in the command wait state or the data read state to more than 2 times the sampling time in the data write state within the tolerable range of the servo control frequency band. In addition, the relationship between the sampling time and the first time may be set as described above only in the command wait state or the data read state of the magnetic disk unit, and may be set similarly to the conventional case in the data write state. Furthermore, the relationship between the sampling time and the first time may be set as described above only in the data write state of the magnetic disk unit, and may be set similarly to the conventional case in the command wait state or the data read state.

In the flow charts shown in FIGS. 9 and 11, a switching is made between the command requesting firmware and the reading or writing firmware. But in a modification of the above described embodiment, it is possible to provide a flag which indicates the data write state and states other than the data write state, and to use one firmware by discriminating the state of this flag.

When the ratio of the first time with respect to the sampling time is set smaller than that of the conventional case, the intervals with which the servo process is carried out by processing the position information slightly increase, thereby slightly deteriorating the positioning characteristic of the magnetic head with respect to the magnetic disk compared to the conventional case. However, when an error is generated during the data read or the data write, it is possible to carry out a known retry operation so as to compensate for the error. During the retry operation, it is possible to set the relationship of the first time and the sampling time similarly to the conventional case or, to set the relationship of the first time and the sampling time similarly to the conventional case depending on the number of retry operations carried out.

Of course, in the above described embodiment, it is possible to reproduce the servo information from each of the plurality of magnetic disks by the corresponding heads (that is, applicable to the data-surface servo system) or, to reproduce the servo information from a single magnetic disk provided exclusively for the servo information by a corresponding one of the heads (that is, applicable to the servo-surface servo system).

Further, the present invention is not limited to these embodiments, but various variations and modifications may be made without departing from the scope of the present invention.

What is claimed is:

1. A storage unit comprising:

at least one head reproducing servo information from a medium;

process means for carrying out a servo process to position said head with respect to the medium; and setting means for setting a ratio of a first time with respect to a sampling time smaller in one of a data read state and a command wait state than in a data write state, said sampling time being made up of the first time in which the servo process is carried out by said process means, and a second time in which a process with respect to a request from an external host unit is carried out.

2. The storage unit as claimed in claim 1, wherein said setting means sets the ratio such that the ratio of the first time with respect to the sampling time is approximately 25% or less.

3. The storage unit as claimed in claim 2, which further comprises reducing means for reducing the ratio of the first time with respect to the sampling time in the data write state at predetermined intervals.

4. The storage unit as claimed in claim 1, which further comprises reducing means for reducing the ratio of the first time with respect to the sampling time in the data write state at predetermined intervals.

5. The storage unit as claimed in claim 4, wherein said process means only monitors position information of the servo information during the first time having a reduced ratio with respect to the sampling time.

6. The storage unit as claimed in claim 5, wherein the first time having the reduced ratio with respect to the sampling time is approximately 10% of the sampling time in the data write state or less.

7. The storage unit as claimed in claim 4, wherein said setting means sets the sampling time in one of the data read state and command wait state to approximately 2 times the sampling time in the data write state or greater.

8. The storage unit as claimed in claim 1, wherein each of a plurality of heads reproduces the servo information from a corresponding one of a plurality of mediums.

9. The storage-unit as claimed in claim 1, wherein one of a plurality of heads reproduces the servo information from one of a plurality of mediums.

* * * * *